US006754656B1

(12) United States Patent
Cornwell et al.

(10) Patent No.: US 6,754,656 B1
(45) Date of Patent: Jun. 22, 2004

(54) SYSTEM AND METHOD FOR SELECTIVE PARTITION LOCKING

(75) Inventors: Karelle Lynne Cornwell, San Jose, CA (US); Barbara Tanya Couch, Morgan Hill, CA (US); Robert William Lyle, San Jose, CA (US); James Zu-Chia Teng, San Jose, CA (US); Julie Ann Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1414 days.

(21) Appl. No.: 08/735,168

(22) Filed: Oct. 22, 1996

(51) Int. Cl.[7] .............................................. G06F 17/30
(52) U.S. Cl. ............................. 707/8; 707/9; 707/100; 707/101
(58) Field of Search ............................. 707/2, 3, 201, 707/202, 8, 100, 101, 9; 395/726, 674

(56) References Cited

U.S. PATENT DOCUMENTS

| | | | |
|---|---|---|---|
| 4,399,504 A | | 8/1983 | Obermarck et al. ......... 364/200 |
| 4,716,528 A | * | 12/1987 | Crus et al. ................... 395/726 |
| 4,727,485 A | | 2/1988 | Keshlear et al. ............ 364/200 |
| 4,933,848 A | * | 6/1990 | Haderle et al. .............. 707/201 |
| 4,965,719 A | | 10/1990 | Shoens et al. ............... 364/200 |
| 5,226,143 A | | 7/1993 | Baird et al. .................. 395/425 |
| 5,301,290 A | | 4/1994 | Tetzlaff et al. .............. 395/425 |
| 5,448,727 A | * | 9/1995 | Annevelink ................. 707/101 |
| 5,455,942 A | * | 10/1995 | Mohan et al. ............... 707/202 |
| 5,551,027 A | * | 8/1996 | Choy et al. .................. 707/201 |
| 5,625,811 A | * | 4/1997 | Bhide et al. ..................... 707/2 |
| 5,625,815 A | * | 4/1997 | Maier et al. ..................... 707/8 |
| 5,675,797 A | * | 10/1997 | Chung et al. ................ 395/674 |
| 5,692,174 A | * | 11/1997 | Bireley et al. .................. 707/3 |
| 5,692,182 A | * | 11/1997 | Desai et al. .................. 707/10 |
| 5,758,345 A | * | 5/1998 | Wang .......................... 707/100 |

FOREIGN PATENT DOCUMENTS

WO     WO 91/03024     3/1991

OTHER PUBLICATIONS

IBM Technical Disclosure Bulletin, "Method for Performance Enhancement in the Parallel Execution of Static Database Transactions", Aug. 1994, vol. 37, No. 8, pp. 609–614.
"Integrated Concurrency–Coherency Controls for Multisystem Data Sharing", Daniel M. Dias, Balakrishna R. Iyer, John T. Robinsion & Philip S. Yu, I.E.E.E. Trans on Software Engineering, vol. 15, No. 4, New York, New York (1989).
"Efficient Locking and Caching of Data In the Multisystem Shared Disks Transaction Environment", 3rd Inv. Conf. on Extending Database Technology, (Vienna, Mar. 1992).
"An Introduction to Database Systems", Chapter 14 "Concurrency", C.J. Date, 6th edition, Addison–Wesley Systems Programming Series, 1995, pp. 391–415.

* cited by examiner

Primary Examiner—Charles Rones
(74) Attorney, Agent, or Firm—Sawyer Law Group LLP

(57) ABSTRACT

A system and a method are described for selectively locking the partitions of a partitioned table in a relational database. The database system locks only those partitions of the table that are accessed by an application. Other partitions are available for concurrent access by other applications, regardless of the strength of the lock needed.

30 Claims, 4 Drawing Sheets

SYSTEM AND METHOD FOR SELECTIVE PARTITION LOCKING

BACKGROUND OF THE INVENTION

1. Field of the Invention

This invention relates generally to the field of database management, and more particularly to a system and method within the field of database management for providing concurrent access to database contents by individually locking partitions of a table without locking the entire table.

2. Description of the Related Art

The need to provide concurrent access to database contents is a recurring requirement in current database technology. Concurrency applies to multiple applications requiring access to the same data at the same time through one database management system (DBMS), and to multiple database systems accessing the same data at the same time. The former circumstance is referred to as the "non-data-sharing environment", while the latter is denoted as the "data-sharing environment". Today, databases are increasingly large, and requirements to access their contents are growing geometrically. Further, growing numbers of independent operations are seeking concurrent access.

Typically, database access is provided by way of application programs ("applications") that employ transactions, basic units of recovery and concurrency in database processing. Concurrent application access is highly desirable.

The virtually universal technique of concurrency control is locking. In this regard, an application will acquire a lock on an object in the database in which it has an interest for reading, inserting, deleting, or changing. In order to ensure that the object will not change while the application is accessing it, the database management system provides a lock giving the application access to the object, while preventing other applications from modifying the object for so long as the application holds the lock.

In a relational database system, contents of a database are represented as tables of data values. Each table corresponds to a relation. In a relational database, a table can be divided into partitions. Each partition contains a portion of the data in the table. A table may be divided into partitions based upon a range of values for a specified key. For example, in the language of the well-known DB2 database system available from International Business Machines Corporation, Armonk, N.Y., the syntax of a CREATE TABLESPACE statement includes a NUMPARTS clause that identifies the created table space as partitioned and sets the number of partitions. Partitions on a table in partitioned table space are characterized by a PART clause in a CREATE INDEX statement. By partitioning a table, partitions containing more frequently-used data can be placed on faster devices, and parallel processing of data can be improved by spreading partitions over different DASD volumes, with each I/O stream on a separate channel path. This speeds up and increases the efficiency of access to data in a relational database.

However, when access is granted to an application, the entire table is locked, even if only a subset of the data (e.g. data for only a few partitions) will be accessed. When a table is partitioned, locking the entire table may degrade concurrency and database system performance.

It is an object of the present invention, therefore, to provide a practical and economic means by which concurrent access to a partitioned table may be enhanced, without degrading database system performance. It is a further object of the present invention to provide a means for serializing access to a partitioned table in a relational database without requiring locking of the entire table when a serialized application requires access to less than all of the partitions of the table.

SUMMARY OF THE INVENTION

Our invention involves, in connection with the operation of a database system, the use of selective partition locking that allows the database system to lock only those partitions of a partitioned table space to which access is sought by a first application. Other partitions of the same table are left available for concurrent access by one or more second applications, regardless of the level of the lock on the partitions accessed by the first application.

With selective partition locking, only the partitions that are accessed by an application are locked. This allows highly concurrent access to separate portions of data in a table. For example, if a first application requires a shared (S) lock for reading data from partition A, while a second application requires an intent exclusive (IX) lock to update data in partition B, the incompatibility between the lock types will not result in delay of one application because the table will not be wholly locked on behalf of the other application. Therefore, both applications can run concurrently, using the same table. Without selective partition locking, the entire table would be locked and access for the applications would be serialized with respect to the table.

Our invention further provides for locking any partition of a table at the lowest lock state needed to serialize access to data in that partition. Thus, for example, if a first application is reading from partition A and updating in partition B, it can acquire an intent shared (IS) lock on partition A, and an IX lock on partition B. As a result, concurrent access for a greater number of processing activities can be tolerated in all partitions of the table. Without selective partition locking, the entire table would be locked by an IX lock.

Our selective partition locking invention also improves the performance of data-sharing systems. In a data-sharing environment without selective partition locking, several systems accessing the same partitioned table space might experience an unacceptably high rate of unnecessary lock contentions because the entire table space is locked. In order to reduce unnecessary lock contentions, selective partition locking associates each lock request for a page or row lock with a particular partition lock, rather than with the table space lock. This reduces the number of page and row locks that need to be propagated beyond a local resource lock manager to a global lock manager in order to resolve locking conflicts.

We also contemplate programming-level implementation of our selective partition locking by expansion of the syntax of a LOCK TABLE statement to include the specification of a specific partition to lock. This affords an application programmer with the ability to boost the performance of a query which accesses many rows in a particular partition, without hindering access to data in other partitions of the table.

Other features and advantages of the present invention will become apparent from the following more detailed description, taken in conjunction with the accompanying drawings, which illustrate, by way of example, the principles of the invention.

This detailed description is intended to illustrate the principles underlying the invention and to signify the invention's reduction to practice. This preferred embodiment is merely illustrative of one possible way in which our invention may be practiced. Manifestly, utilizing the teachings of this detailed description, corresponding systems and procedures may readily be conceived and reduced to practice for operating a database system.

Consider the following sequence of SQL statements:

```
CREATE TABLESPACE TPIAA201
          NUMPARTS 8
          LOCKSIZE ROW;
CREATE TABLE TBIAA201
    (   LASTNAME VARCHAR(20),
        FIRSTNAME CHAR(20),
        GENDER CHAR(1),
        SALARY INTEGER,
        BONUS INTEGER,
        DEPT CHAR(4) )
    IN TPIAA201;
CREATE INDEX IPIAA201
    ON TBIAA201
    (LASTNAME)
    CLUSTER (    PART 1 VALUES ('CZZZZZZZZZZZZZZZZZZZZ'),
                 PART 2 VALUES ('FZZZZZZZZZZZZZZZZZZZZ'),
                 PART 3 VALUES ('HZZZZZZZZZZZZZZZZZZZZ'),
                 PART 4 VALUES ('KZZZZZZZZZZZZZZZZZZZZ'),
                 PART 5 VALUES ('OZZZZZZZZZZZZZZZZZZZZ'),
                 PART 6 VALUES ('SZZZZZZZZZZZZZZZZZZZZ'),
                 PART 7 VALUES ('VZZZZZZZZZZZZZZZZZZZZ'),
                 PART 8 VALUES ('ZZZZZZZZZZZZZZZZZZZZ'));
```

BRIEF DESCRIPTION OF THE DRAWING

FIG. 5 illustrates a storage device on which software embodying the invention is stored.

DETAILED DESCRIPTION OF THE PREFERRED EMBODIMENTS

The preferred embodiment of our invention provides selective partition locking (SPL) by which a database management system (DBMS) acquires locks only on those partitions of a table containing data that is accessed by an application. According to our invention, selective partition locking leaves other partitions of that table available for concurrent access by other applications, regardless of the strength of the lock necessary to access the other partitions.

Figure 1:
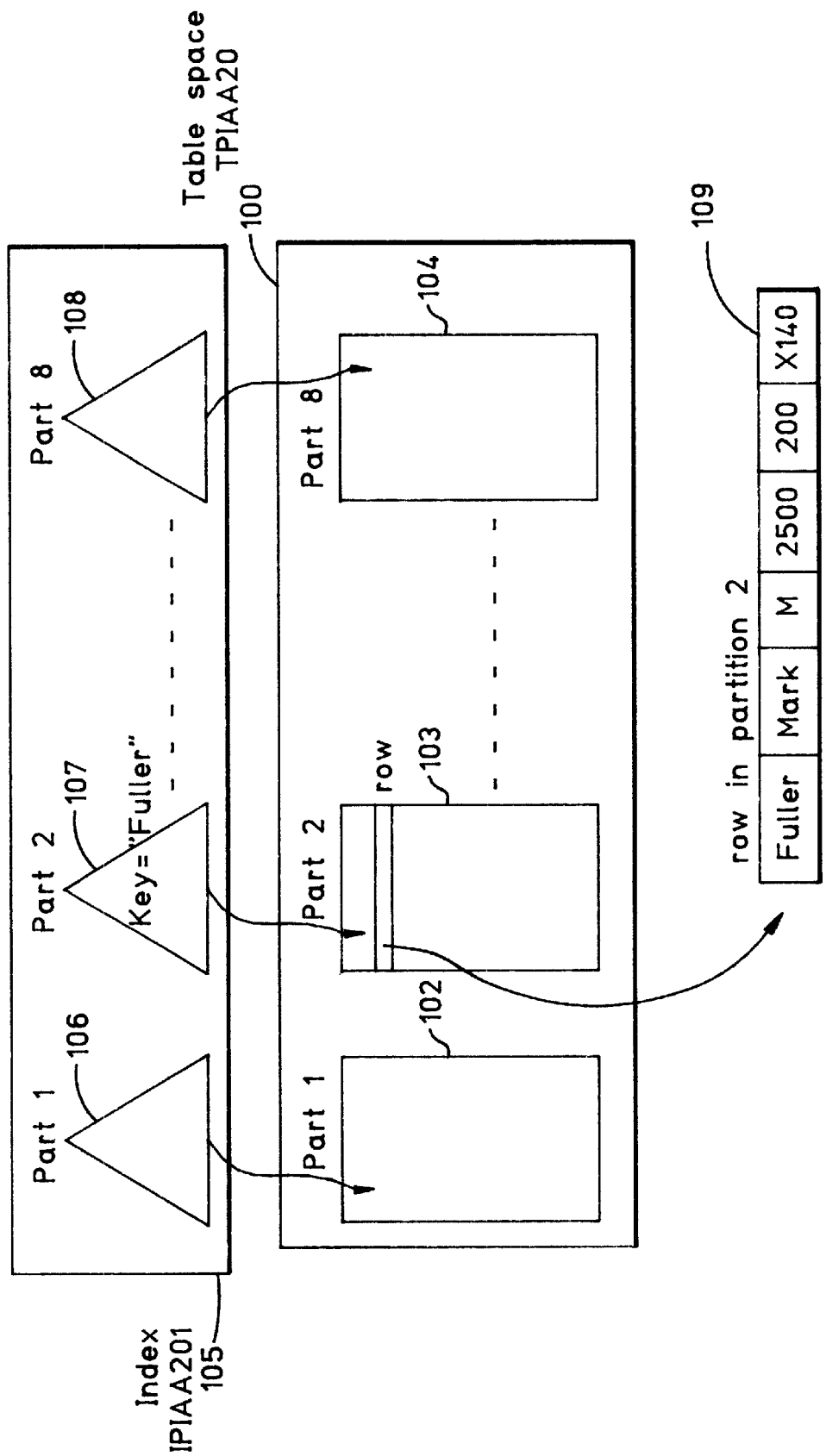
FIG. 1 is an illustration of data structures that exist in a relational database system following the creation and partitioning of a table using a series of SQL (structured query language) statements.

The CREATE TABLESPACE statement creates table space TPIAA201, and identifies the table space as partitioned into eight partitions (NUMPARTS 8). The next statement creates a table TBIAA201 in the partitioned table space and defines the columns of the table. The third statement creates a partitioned index IPIAA201 on the table and defines the range of the partitioning key (LASTNAME) for each partition. The result is illustrated in FIG. 1 which depicts the table 100 with eight partitions, of which three are shown 102, 103, and 104. The index 105 includes eight partitions, of which three are illustrated 106, 107 and 108. Each index partition indexes to a respective table partition and defines the range of values in that partition for the defined partitioning key. For example, the index partition 107 indexes to last names in which the beginning letter extends from D to F. Thus, the record 109 stored as a row in partition 103 is within the key range for that partition, since the value in the LASTNAME field is "Fuller".

As is known in the prior art, when table space is created, certain conditions may be established at its creation. For example, the programmer who creates the table space may specify whether its contents are to be locked at the row or page level, and also may enable lock escalation in the table space by a lockmax value. According to the invention, selective partition locking can be elected as a condition when table space is created. In this regard, we have added the keyword "LOCKPART" to the CREATE TABLESPACE and ALTER TABLESPACE statements. The LOCKPART keyword may be set to "YES" or "NO". If set to YES, selective partition locking is enabled; otherwise it is not.

These and many other conditions are stored in a database directory 400 when the table space is created, and are indexed 401 in the directory by the name of the table space.

Figure 2:
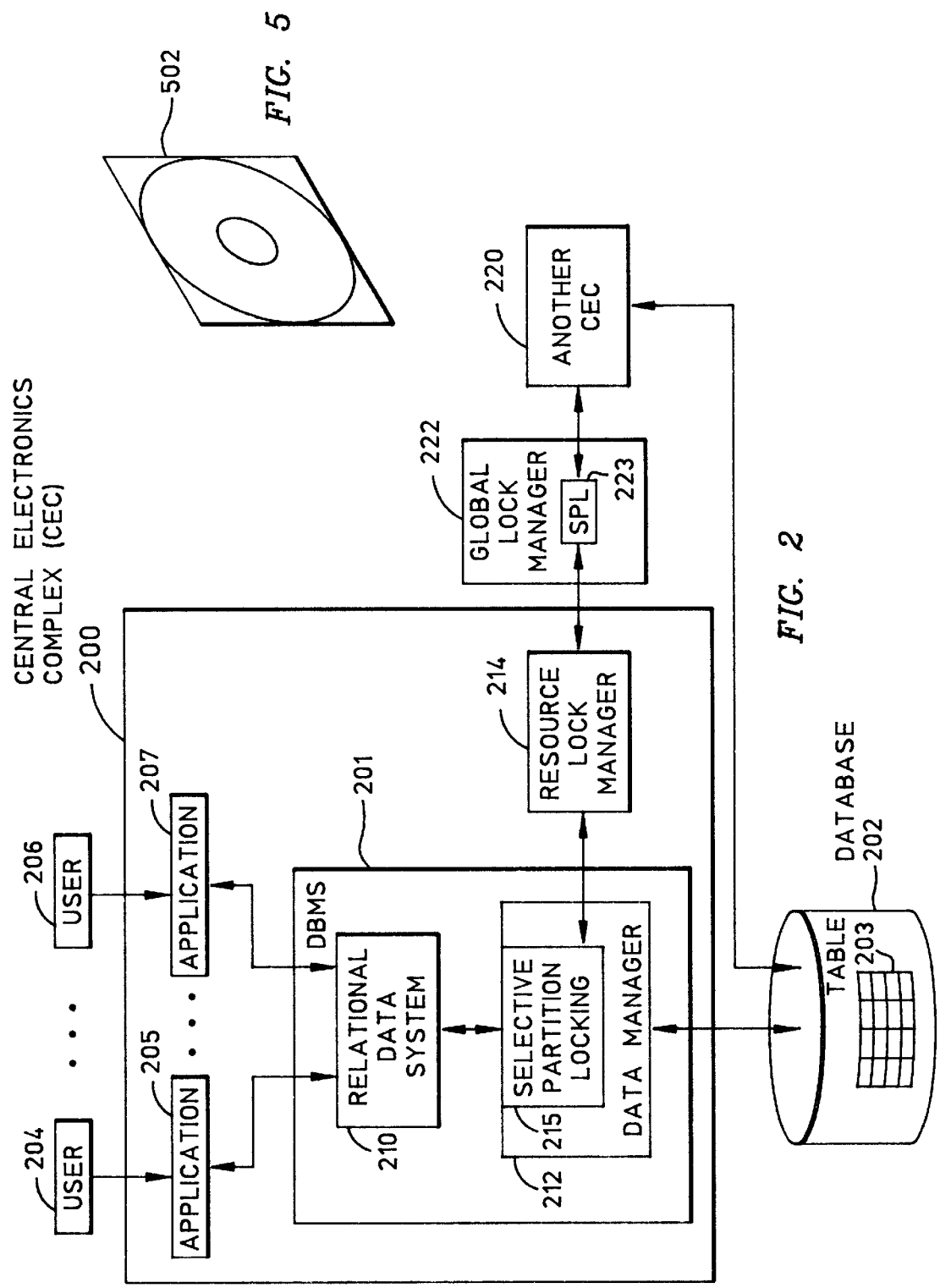
FIG. 2 is a block diagram illustrating the processing flow among system components in the preferred embodiment of this invention.

FIG. 2 illustrates a top level diagram of the components and the flow of activity in the preferred embodiment of our invention from a user, through a central electronics complex, to a database system.

A central electronics complex (CEC) 200 includes a general purpose programmed digital computer on which programs that form a database management system (DBMS) 201 execute to provide users 204, 206 with access to a stored database 202. In the preferred embodiment, the database is a relational database whose contents are organized by relations that are represented as tables of data values, such as the table 203. A user 204 dispatches a request for access to the database 202 by way of an application 205 that is conventionally coupled to the DBMS 201. Other users such as the user 206 access the database 202 by way of the same or other respective applications, such as the application 207. User requests are received by a relational data system (RDS) component 210 of the DBMS 201. The RDS 210 decides what stored data is required to satisfy a user request and requests access to the data on behalf of the application from which the request was received. A data manager (DM) 212 receives requests for access to records from the RDS 210. Before the DM 212 retrieves data requested by the RDS 210, it submits a request for a lock on the data to a resource lock manager (RLM) 214. The RLM 214 provides a locking service to the DBMS 201, managing locks on data in the database 202.

As thus far described, with access to the database 202 coming only CEC 200, the non-data sharing environment is established. In the non-data sharing environment, the DBMS 201 provides concurrent access to the database for a plurality of applications, including the applications 205 and 207. Concurrency is enhanced by the invention, which is embodied in programming logic in various modules of the DM 212 that is represented by a selective partition locking component 215.

In the data-sharing environment, other CEC's such as the CEC 220 access contents of the database 202, with concurrency between the CEC's 200 and 220 being managed by a global lock manager (GLM) 222. In the data-sharing environment, the GLM 222 includes programming logic that supports hierarchial locking. This existing support is used in a novel way by the DM 212 with SPL 215 to achieve finer granularity in multi-CEC concurrency, i.e. partition-level contention as an alternate to table space contention.

Figure 3:
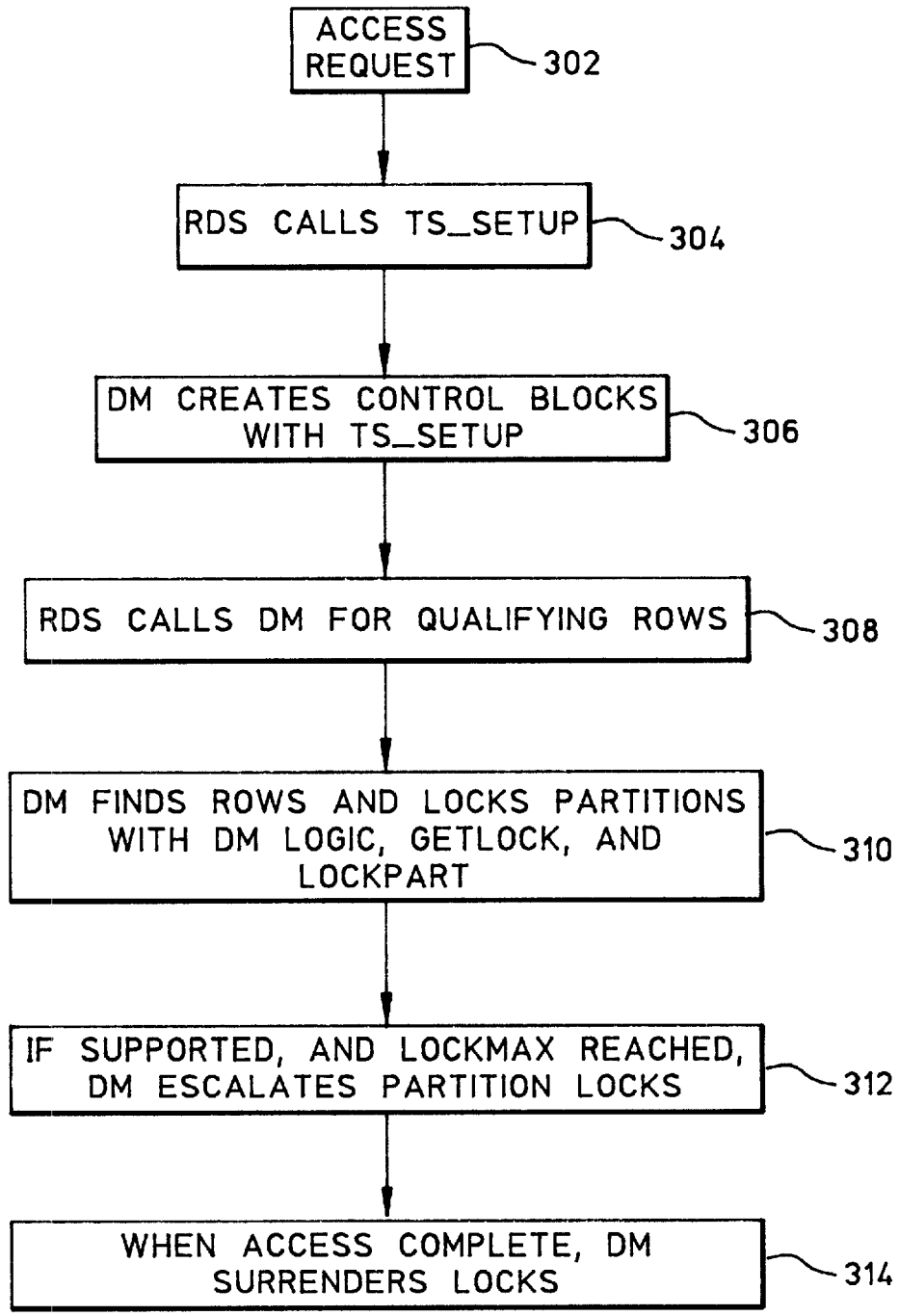
FIG. 3 is a flow diagram illustrating a procedure for selective partition locking according to the preferred embodiment of this invention.

FIG. 3 depicts the process by which selective partition locking is implemented in our invention. FIG. 3 contains references to Tables I–VII which are pseudocode representations of one or more computer programs (software) and of functions of the DM 212 that are performed by the selective partition locking component 215. In practice these functions may be performed by a programmed general purpose digital computer, for example, the DB2 system for the MVS/ESA operating system that executes on a SYSTEM/390 computer, all of which are available from the International Business Machines Corporation, Armonk, N.Y. User access in this invention is by way of terminals on whose behalf applications execute in the computer. These applications may include application programs with embedded SQL statements, or may comprise query processors.

Turning now to a method that embodies selective partition locking according to our invention, FIG. 3 illustrates a first step 302 in which the RDS 210 receives a request for access to data in the database 202. For the purpose of illustration and by way of example such access requests may be in the form of SQL data manipulation statements such as SELECT, INSERT, UPDATE, and DELETE. An access request may include one or more such statements. When it receives an access request at 302, the RDS 210 determines the minimum lock state needed for each statement and then, for each statement, calls the TS_SETUP logic in step 304 sending with the call the proposed lock state and the name of the database table being accessed.

In response to the call made in step 304, the DM in step 306 creates control blocks necessary for the requested operation. The TS_SETUP logic used in this step is illustrated in Table I, where the DM 212 creates a TS control block 402, if one has not been created in response to a previous TS_SETUP call for this access request. The logic also creates one or more TS access control blocks 404, 406, 408 for each statement in the access request. The TS control block 402 is built for the database table that contains the data requested by the application. Certain information from the entry for the table in the database directory 400 is copied to the TS control block 402. Such information includes the state of the SPL flag, the selected locking granularity (row or page), and the lockmax value. If the table space is partitioned, and selective partition locking (SPL) is enabled for the defined, partitioned table space (i.e. LOCKPART YES in a CREATE or ALTER TABLESPACE statement), the DM 212 checks any predefining conditions for using SPL. For example, SPL would not be available to applications whose access path uses a type 1 index. SPL is also not needed if a statement requires locking the entire table in an exclusive mode. If the conditions do not prevent SPL the DM 212 sets an SPL control flag 410 in the TS control block 402. For each statement, the DM stores the lock state requested by the RDS in a TS access control block for the statement (for example, at 436 in control block 404). Otherwise, if SPL is not to be used, the entire table space is locked in the highest requested lock state. When TS_SETUP processing is completed, the DM 212 returns to the RDS 210.

In step 308, the RDS 210 calls the DM 212 to determine which rows qualify for processing by satisfying the conditions of a statement. At least one call is made for each statement. Each call directs the DM 212 to qualify one row in the identified table according to conditions set forth in the statement. For a statement in which "n" rows are to be qualified, looping occurs in the RDS, with the RDS calling the DM n+1 times. The first n calls return data; the (n+1)th call says "finished". Each statement type requires a call to a particular piece of DM logic. A SELECT statement requires a call to DM_SELECT (Table II); DELETE and UPDATE statements require calls to DM_DELETE/UPDATE (Table III); INSERT statements require calls to DM_INSERT (Table IV). The DM 212 responds in step 310. The first step of each of the DM functions requires the requested lock state to be transferred from the TS access control block for a statement to the TS control block (into field 412). The table is then accessed and its rows are analyzed. For example, in Table II, a SELECT statement causes the DM 212 to check for the rows of the table identified in the statement against the conditions set forth in the statement. For each row that meets the qualifications of the statement, the DM 212 first checks to determine whether conditions have been met which allow locking at the requested level to be avoided. If not, the DM 212 checks whether the page containing the row has been locked. In this regard, the granularity of low level locks as between row and page is one of the conditions that can be set by a user and stored in the database directory 401. For any statement in an access request in which a qualifying row or a page containing the qualifying row is not already locked, the GETLOCK logic of Table V is called. The GETLOCK logic uses the TS access control block for a statement being processed and the TS control block for the table referenced in order to determine which partition should be locked. A partition to be locked is a partition containing the qualified row, and the partition is locked by calling the LOCKPART logic to lock the partition in the state specified by the RDS; that state is contained in the TS control block 402 in field 412. When LOCKPART returns to the GETLOCK logic, if the partition is locked with an intent lock, the GETLOCK logic then proceeds to lock the qualified row or page at the level of granularity specified in the TS control block 402 in field 416. The number of row or page locks acquired in the GETLOCK logic for the table is accumulated in the TS control block at 417. If lock escalation is enabled (by a non-zero lockmax value) and the number of row locks (or page locks) acquired is greater than the lockmax value, then the GETLOCK processing calls the LOCKESCA logic of Table VII.

The LOCKPART logic of Table VI checks whether the partition which should be locked has been locked. This is indicated in the TS control block 402 by one of the subfields of field 420. Assuming that the TS control block 402 represents the partitioned table illustrated in FIG. 1 that includes eight partitions, there are eight subfields in field 420, one for each partition, each subfield containing the lock state of a respective partition. In this regard, the ith subfield contains the lock state for partition i. If the partition is locked, but locked in a state that is weaker than the requested lock state, the RLM 214 is called to upgrade the lock state, with the upgraded state being recorded in the appropriate subfield of the field 420. Return is then made to the GETLOCK logic.

Following DM processing of the statement or statements of the access request, the DM exits from step 310.

In step 312 of FIG. 3, if lock escalation is enabled for the table, the LOCKESCA logic Table VII, when called by the GETLOCK logic, first determines whether SPL has been enabled. When SPL has been enabled, the lock state of each partition of the table being accessed by the application is considered. If a partition is locked with an intent lock (IS, IX, or SIX), that state of the lock for the partition is upgraded to the appropriate gross lock. In this regard, in the table space, if a partition is locked IS, the lock is upgraded to S; if a partition is locked IX or SIX, the lock is upgraded to X. When a lock is upgraded, the new lock state for the partition is recorded in the appropriate subfield of the Table control block 402. In addition, an escalation flag (Esc flag) 419 is set in control block 402 by which later requests by the same application for other partitions of the same table will be escalated automatically.

In step 314, when the requested access has been completed, locks are released by the DM 212, using conventional rules and means, and according to various conditions.

Figure 4:
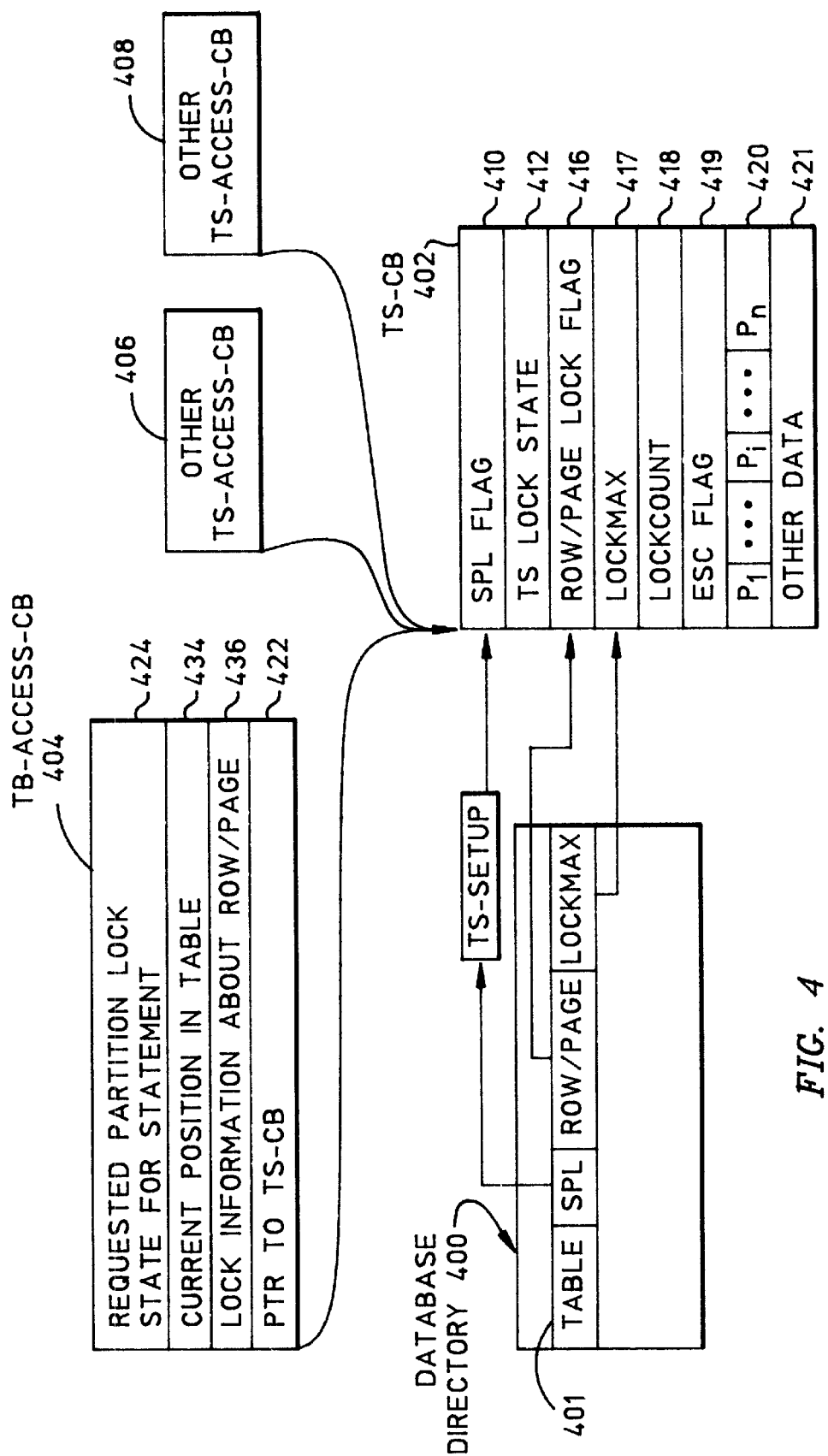
FIG. 4 is an illustration of the structures of tables containing control information used during processing according to the preferred embodiment of this invention.

The information contained in the TS control block 402 and in one or more TS access control blocks 404, 406 and 408 is illustrated in FIG. 4. The fields of the TS control block 402 include: SPL flag 410 comprising code indicating whether or not SPL has been elected; TS lock state 412 that contains the lock state moved by the first statement of any one of the DM functions in Table II, III, and IV; the row lock flag 416 containing code indicating the users's selection of either row or page locking; a lockmax field 417 containing the lockmax value that indicates the maximum number of page and row locks held at any one time in the table space; a lock count field 418 that accumulates the number of either row or page locks acquired on the table represented by the control block 402; and a field for the Esc flag 419. The field 420 contains one subfield for each partition of the represented table; each subfield includes one entry only for the partition it represents; and the ith subfield contains the lock state for partition i. It is important to note that there may be no lock state given for partitions that are in the field 420 if the application is not accessing those partitions. Other control data is stored in fields 21.

The TS access control blocks 404, 406, 408 have essentially identical formats, and only the format of TS access control block 404 will be described. There are typically as many TS access control blocks as there are statements in an access request, and the TS access control blocks of an access request are linked to a TS control block by a pointer. Thus, the TS access control block 404 includes a pointer field 422 containing a pointer to the TS control block 402. In addition, the TS access control block 404 includes a field 424 into which the acquired state of the partition lock for the associated statement received from the RDS 210 is placed; a field 434 denoting the current position of the DM process within the table space in the form of a record identification (RID), which contains the page and partition number where the row is located; and a field 436 containing lock information about the page that contains the just-qualified row.

With selective partition locking according to FIGS. 3 and 4, any application of FIG. 2 can request access to the database 202, and have its access protected against interference by possession of locks, including partition locks. All locks, including partition locks, are managed by the RLM 214 according to a locking scheme that provides concurrency control with serializability, levels of isolation, and intent locking. In this regard, reference is given to C. J. Date, AN INTRODUCTION TO DATABASE SYSTEMS, Reading, Massachusetts: Addison-Wesley (1995), pp. 391–415.

Therefore, with reference to FIGS. 1–4, and with SPL enabled, assume the application 205 submits an access request by which locks are acquired on its behalf on partitions and rows of the table 100 in the database 202. Assume that the application 205 has locked partition 103 in IS mode and that application 207 later requests access to data in the partition 103 in IX mode. In this case, the RLM 214 will grant the request of application 207, since the lock types are compatible, thereby permitting concurrent access to the partition, without locking the entire table 100. However, if the application 207 had sought an exclusive (X) lock on partition 103, its request would have been denied for the duration of the IS (or S, if escalated) lock held on partition 103 by application 205. In this regard, the access to partition 103 would be serialized, thereby protecting the access to partition 103 by application 205 against interference in the form of updates to the partition by application 207.

Returning to FIG. 2, in the data sharing environment, locking is managed by the GLM 222 in conjunction with the RLMs of the CECs 200 and 220. Relatedly, assume the application 205 requests access to an identified unit of data in the database 202. This request is passed to the RLM 214 by the DBMS 201 serving the application 205. Implicit in the request is a request for lock. The RLM 214 forwards the lock request by message to the GLM 222. The GLM 222 receives and processes lock grant requests from its RLMs and processes the requests, granting locks by means of messages returned to the requesting RLMs.

When the application 205 requests access to a record in the database 202, the DBMS 201 will request a lock on the record, or on the page that contains the record, if page level locking in effect. Before the record/page lock is requested, the DBMS 201 will also request an object lock in the database 202, where the record is stored. In the prior art, the object lock would be on the table containing the record. The table lock will need to be forwarded to the GLM 222 by RLM 214. The record/page lock requested by DBMS 201 is associated with the table lock. If another DBMS has a lock on the table, the record/page lock will also need to be forwarded to the GLM 222 by RLM 214.

In the invention, the object locked will be the partition that contains the record. DMBS 201 will associate the record/page lock with the partition that contains the record. Therefore, if the partition lock is not held by other DBMSs, RLM 214 can grant the record/page lock locally without sending the request to GLM 222. This reduces the amount of page and row locks that need to be propagated beyond the RLM to the GLM in order to resolve locking conflicts.

Therefore, with SPL, the tracking to avoid sending page/row locks to GLM can be done at the partition level, instead of at the table level.

The invention further extends to a database language statement for explicitly locking partitions, having the following syntax:

LOCK TABLE(name) PART(part nos.) IN → SHARE → MODE.
⌊EXCLUSIVE ↑

This statement is an extension of a known LOCK TABLE statement; it may be used by a programmer to explicitly lock one or more partitions of the named table in either exclusive (X) or in shared (S) mode. Of course when locked in exclusive mode, no other application can access any part of a locked partition for any purpose for so long as the lock is held. In shared mode, other applications can access a locked partition for read-only access.

When issued, the statement is processed by DBMS 201 and the resource lock manager 214 in the same manner as the prior art LOCK TABLE statement except that a single partition or set of partitions of the named table are locked instead of the entire table.

When the invention is practiced as a procedure performed by a programmed general purpose digital computer, it may also comprise an article of manufacturing, embodied as a computer program product in a form illustrated in FIG. 5. A program comprising a plurality of program steps, or means for performing program steps, written in a computer language, is compiled into object form and stored on a program storage device such as a disk 500. The program steps implement the pseudocode of Tables I–VII and may be included in the computer program of a data manager in a DBMS. Those skilled in the art will appreciate that the storage device 500 is merely illustrative of storage media in which a computer program may be fixed, in whole or in part, for greater or shorter periods of time. Such media include, without reservation, disk, tape, ROM, RAM, system nodes, and network nodes. TABLE I

TABLE I

TS_SETUP
input = lock-state, table id

Create TS-access control block (TS-access-CB)
Create TS control block (TS-CB)
IF table space is partitioned THEN
    IF table space is defined for Selective Partition Locking (SPL) THEN
        IF all conditions for using SPL are met THEN
            (SPL not used if access path includes type 1 index, or
            statement is LOCK TABLE IN EXCLUSIVE MODE, or if
            plan was bound ACQUIRE (ALLOCATE))
        DO.
            Indicate in TS control block that SPL should be used
            Store lock state in TS-access control block
        END.
    ELSE
        Indicate in TS control block that SLP should not be used
IF not using SPL THEN
    IF table space not locked in at least the requested lock state THEN
        Lock table space

TABLE II

DM_SELECT
input = TS-access-CB, TS-CB

Transfer requested lock state from TS_access-CB to TS-CB
Check for qualifying row
IF lock avoidance fails THEN
    IF row qualifies & row/page is not already locked THEN
        Call GETLOCK

TABLE III

DM_DELETE/UPDATE
input = TS-access-CB, TS-CB

Transfer requested lock state from TS_access-CB to TS-CB
Check for qualifying row
IF row/page is not already locked THEN
    Call GETLOCK

TABLE IV

DM_INSERT
input = TS-access-CB, TS-CB

Transfer requested lock state from TS_access-CB to TS-CB
Find candidate page for inserting row
IF row/page is not already locked THEN
    Call GETLOCK

TABLE V

GETLOCK
input = TS-access-CB, TS-CB

IF using SPL THEN
    Determine which partition should be locked
    Call LOCKPART to lock partition in state specified in TS-CB
IF gross lock not held on the table space or partition THEN
    DO.
        IF page locking THEN
            Call RLM to lock the page
            Increment lock count
        ELSE
            Call RLM to lock the row
            Increment lock count
        IF lock-escalation is enabled and lock count $\geq$ lockmax
            THEN
            call LOCKESCA
END.

TABLE VI

LOCKPART
input = lock-state, part-num

IF partition not locked THEN
    Call RLM to lock partition
    Record new lockstate for partition in TS-CB
ELSE
    IF lock state of partition < requested lock state THEN
        Call RLM to upgrade lock state
        Record new lockstate for partition in TS-CB

TABLE VII

LOCKESCA
Input = TS-CB

If using SPL THEN
    DO I = 1 to number-of-partitions-in-TS
        IF partition(I) locked IS THEN
            Call RLM to upgrade lock to S
            Record new lockstate in TS-CB
        ELSE
            IF partition(I) locked IX or SIX THEN
                Call RLM to upgrade lock to X
                Record new lockstate in TS-CB
End.

Equivalent Embodiments

Although the preferred embodiment and best mode are described with reference to a relational database system of the DB 2-type, that uses physical partitioning where every partition maps to a data set, this is for illustration only. We do not intend to limit the application of our invention only to such physical partitioning, nor to partitioning based on partitioning key values. We contemplate the application of our invention to other types of partitioning, such as fragmenting by round robin and other means.

Generally, we intend for our invention to apply to a partition as some grouping of data in which all rows of the group belong to a partition, and the partition to which a row belongs can be ascertained by inspection of the row. In this regard, the invention may be considered as implementing a table→page/row locking hierarchy as n partition →page/row locking hierarchies for additional concurrency between application that tend to access different partitions.

We contemplate further that the invention may be extended to vertical data partitions.

Therefore, it is to be understood that this, the presently preferred embodiment of our invention, is only representative of subject matter which we broadly contemplate as being fully encompassed by other embodiments that will become obvious to those skilled in the art, and that the scope of our invention is accordingly to be limited by nothing other than the appended claims.

We claim:

1. A method for controlling concurrency of access to data in a database system, comprising:
    partitioning a table in the database system into a plurality of partitions;
    receiving a request for access to data in the table;
    determining a partition of the plurality of partitions that contains the data;
    locking the partition in response to the request; and
    granting access to the partition.

2. The method of claim 1, wherein granting access to the partition includes serializing access to the partition at a lock state.

3. The method of claim 2, wherein locking the partition includes locking the partition at the lock state and serializing access to the partition includes permitting access to the partition for access requests that are compatible with the lock state.

4. The method of claim 3, wherein the access to the data comprises access by a plurality of applications through a single database system.

5. The method of claim 3, further including receiving a lockmax value, accumulating for an applications, number of requests for access to the records in the table by the application, comparing the number of requests with the lockmax value, and, when the number of requests equals the lockmax value, escalating the lock state.

6. The method of claim 1, wherein the access to the data comprises access by a plurality of database systems.

7. The method of claim 1, wherein receiving a request for access includes receiving a request for a record in the table.

8. The method of claim 1, wherein receiving a request for access includes receiving a request to lock the partition.

9. The method of claim 8, wherein the request is a request for a shared lock.

10. The method of claim 8, wherein the request is a request for an exclusive lock.

11. A database management system that manages a database system containing data in tables, comprising:
    a database system component to partition a table in the database system into a plurality of partitions; and
    a data manager that:
        receives a request for access to data in the table;
        determines a partition of the plurality of partitions that contains the data; and
        obtains a lock on the partition in response to the request.

12. A combination including the database management system of claim 11 and a lock manager that:

grants the lock on the partition; and serializes access to the partition at a lock state.

13. The combination of claim 12, wherein the database manager obtains the lock at the lock state and the lock manager serializes access to the partition by granting requests for locks on the partition that are compatible with the lock state.

14. The combination of claim 13, wherein the lock manager is coupled to a plurality of database systems.

15. The combination of claim 13, wherein the requests for locks represent requests for access to the table from a plurality of applications coupled to the database management system.

16. The combination of claim 13, further including a lockmax value, wherein the database manager accumulates for an application a number of requests for access to records in the table by the application, compares the number of requests with the lock max value, and, when the number of requests equals the lockmax value, requests escalation of the lock state.

17. The database management system of claim 11, wherein a request for access includes a request for a record in the table.

18. The database management system of claim 11, wherein the request for access includes a request to lock the partition.

19. The database management system of claim 18, wherein the request is a request for a shared lock.

20. The database management system of claim 18, wherein the request is a request for an exclusive lock.

21. A computer program product comprising a machine-readable storage having stored therein a plurality of machine-executable program steps for a new use for a database management system in controlling concurrency of access to data in a database, said plurality of stored, machine-executable program steps including:

partitioning a table in the database system into a plurality of partitions;

receiving a request for access to data in the table;

determining a partition of the plurality of partitions that contains the data;

locking the partition in response to the request; and granting access to the partition.

22. A computer program product of claim 1, wherein granting access to the partition includes serializing access to the partition at a lock state.

23. A computer program product of claim 22, wherein locking the partition includes locking the partition at the lock state and serializing access to the partition includes permitting access to the partition for access requests that are compatible with the lock state.

24. A computer program product of claim 23, wherein the access to the data comprises access by a plurality of database systems.

25. A computer program product of claim 23, wherein the access to the data comprises access by a plurality of applications through a single database system.

26. A computer program product of claim 23, further including receiving a lockmax value, accumulating for an application a number of requests for access to the records in the table by the application, comparing the number of requests with the lockmax value, and, when the number of requests equals the lockmax value, escalating the lock state.

27. A computer program product of claim 21, wherein receiving a request for access includes receiving a request for a record in the table.

28. A computer program product of claim 21, wherein receiving a request for access includes receiving a request to lock the partition.

29. A computer program product of claim 28, wherein the request is a request for a shared lock.

30. A computer program product of claim 28, wherein the request is a request for an exclusive lock.

* * * * *

UNITED STATES PATENT AND TRADEMARK OFFICE
CERTIFICATE OF CORRECTION

PATENT NO.    : 6,754,656 B1
DATED         : June 22, 2004
INVENTOR(S)   : Karelle Lynne Cornwell et al.

It is certified that error appears in the above-identified patent and that said Letters Patent is hereby corrected as shown below:

Column 5,
Line 34, after "only" add -- through the --.

Signed and Sealed this

Fifteenth Day of March, 2005

JON W. DUDAS
*Director of the United States Patent and Trademark Office*